(12) United States Patent
Jansen

(10) Patent No.: US 11,815,064 B2
(45) Date of Patent: Nov. 14, 2023

(54) METHOD FOR TESTING A LIGHTNING PROTECTION SYSTEM IN A WIND TURBINE ROTOR BLADE

(71) Applicant: Wobben Properties GmbH, Aurich (DE)

(72) Inventor: Gerhard Jansen, Vrees (DE)

(73) Assignee: Wobben Properties GmbH, Aurich (DE)

( * ) Notice: Subject to any disclaimer, the term of this patent is extended or adjusted under 35 U.S.C. 154(b) by 68 days.

(21) Appl. No.: 17/636,316

(22) PCT Filed: Aug. 20, 2020

(86) PCT No.: PCT/EP2020/073353
§ 371 (c)(1),
(2) Date: Feb. 17, 2022

(87) PCT Pub. No.: WO2021/032846
PCT Pub. Date: Feb. 25, 2021

(65) Prior Publication Data
US 2022/0282707 A1 Sep. 8, 2022

(30) Foreign Application Priority Data
Aug. 22, 2019 (DE) .................... 10 2019 122 583.3

(51) Int. Cl.
*F03D 13/30* (2016.01)
*F03D 80/30* (2016.01)

(52) U.S. Cl.
CPC ............. *F03D 13/30* (2016.05); *F03D 80/30* (2016.05); *F05B 2260/83* (2013.01)

(58) Field of Classification Search
CPC ....... F03D 13/30; F03D 80/30; F05B 2260/83
See application file for complete search history.

(56) References Cited

U.S. PATENT DOCUMENTS

| | | | |
|---|---|---|---|
| 2011/0140060 A1* | 6/2011 | Olson ................. | F03D 80/50 254/394 |
| 2011/0140724 A1* | 6/2011 | Olson ................. | F03D 80/30 324/722 |
| 2011/0142643 A1 | 6/2011 | Hardison et al. | |
| 2011/0182731 A1* | 7/2011 | Naka .................. | F03D 80/30 416/1 |

(Continued)

FOREIGN PATENT DOCUMENTS

| | | |
|---|---|---|
| DE | 10 2005 017 865 A1 | 11/2006 |
| DE | 10 2017 120 407 A1 | 10/2018 |

(Continued)

*Primary Examiner* — Long T Tran
(74) *Attorney, Agent, or Firm* — SEED INTELLECTUAL PROPERTY LAW GROUP LLP

(57) ABSTRACT

A method for testing a lightning protection system in a wind turbine rotor blade is provided. The lightning protection system is contacted in the region of a rotor blade root. A measuring line having an electrically conductive tip is positioned in the interior of the rotor blade or outside on the rotor blade until the conductive tip is in contact with an element of the lightning protection system. A signal is fed via the measuring line and the signal arriving at the lightning protection system in the region of the rotor blade root is measured in order to check the mode of operation of the lightning protection system in the rotor blade.

12 Claims, 5 Drawing Sheets

(56) References Cited

U.S. PATENT DOCUMENTS

2013/0336786 A1* 12/2013 Kissinger ................ F03D 80/30
                                                                        416/61
2019/0316568 A1* 10/2019 Nielsen ................... F03D 80/50
2020/0291925 A1* 9/2020 Garcia Perez ......... H01R 39/44

FOREIGN PATENT DOCUMENTS

| EP | 3 693 601 A1 | 8/2020 |
| JP | 2013-29351 A | 2/2013 |
| JP | 2017150324 A | 8/2017 |
| JP | 2019027413 A | 2/2019 |

* cited by examiner

METHOD FOR TESTING A LIGHTNING PROTECTION SYSTEM IN A WIND TURBINE ROTOR BLADE

BACKGROUND

Technical Field

The present invention relates to a method for testing or checking a lightning protection system in a wind turbine rotor blade.

Description of the Related Art

As a result of the height of wind turbines and the length of the rotor blades of wind turbines, every wind turbine must have an effective lightning protection system since otherwise a lightning strike could damage the wind turbine.

The operating principle of the lightning protection system must be able to be tested. This is typically accomplished from outside, wherein a contact to the lightning protection system must be made in the region of the rotor blade tip. For this purpose, working at height is required, for example, in the form of an abseiler, a platform, a climber or alternatively drone technology. To this end the German Wind Energy Association BWE has issued a working guideline for testing lightning protection systems. In this case, for example, the interception devices (receptors) and the arrestor section in the rotor blade must be tested. This is accomplished for example by means of a measurement of the volume resistance at the interception devices (receptors) as far as, for example the earth terminal lug in the foot of the tower. This assumes that the interception devices have been contacted. Work at height must be carried out for this.

With such measurements it can occur that the measurements are not successful. Thus, this can have the result that the operating principle of the lightning protection system must be tested in a different manner.

In the priority-substantiating German Patent Application the German Patent and Trademark Office has cited the following documents: DE 10 2005 017 865 A, DE 10 2017 120 407 A1 and US 2013/0336786 A1.

BRIEF SUMMARY

Provided is a method for testing a lightning protection system in a wind turbine rotor blade. Provided is a method for testing a lightning protection system which makes it possible to simply and reliably test the lightning protection system.

Thus, a method for testing a lightning protection system in a wind turbine rotor blade is provided. The lightning protection system is contacted in the region of the rotor blade root. A measuring line with a conductive tip is introduced into the interior of the rotor blade until the conductive tip is in electrical contact with an element of the lightning protection system. A signal is fed via a measuring line and the signal arriving at the lightning protection system in the region of the rotor blade root is measured in order to test the operating principle of the lightning protection system in the rotor blade. The measuring line is then removed.

According to one aspect of the present invention, the rotor blade has at least one lightning receptor in the region of a rotor blade tip and a lightning protection cable or lightning conductor in the interior of the rotor blade. An electrical contact is made between the electrically conductive tip of the measuring line and the at least one lightning receptor.

For this purpose, for example, a measuring unit can be electrically connected to an arrestor ring at the rotor blade root as part of the lightning protection system. The measuring unit is further connected to a measuring line and a conductive tip (e.g., in the form of a conducting brush). Optionally a weight can be attached to the conducting brush. The conducting brush can then be introduced into the interior of the rotor blade by means of the measuring line. For this purpose, the rotor blade can, for example, be located in a 6 o'clock position so that the measuring line with the conducting brush can be guided downwards as a result of gravity until it makes an electrical contact with the lightning protection system (e.g., in the region of the rotor blade tip). The measuring unit can then, for example, perform a transmission measurement of the lightning protection system using a pulse generator. Alternatively to this, a resistance measurement can be carried out as in the guidelines of the German Wind Energy Association. Furthermore, alternative methods can be carried out. For this purpose, for example, an impulse can be generated by the pulse generator and transmitted through the lightning protection system (e.g., from the rotor blade tip as far as the arrestor ring, for example) in the region of the rotor blade root. The measuring unit can then record the volume resistance and determine whether the lightning protection system is defective or not. Alternatively to this a suitable signal can be generated which makes it possible to assess the state of the arrestor section.

According to one aspect of the present invention, the measuring line is configured as a cable with a chimney sweeps' brush, hearth brush or chimney brush as well as optionally a weight.

The invention thus relates to the use of a chimney brush with an electric cable for testing the operating principle of a lightning protection system in a wind turbine rotor blade. The chimney brush with the electric cable thus serves as a measuring line in order to be able to determine, for example, a volume resistance of the lightning protection system or to transmit a suitable signal.

According to one aspect of the present invention, a positioning of the measuring line and the tip is accomplished by a movable positioning unit inside or outside on the rotor blade.

Optionally the movable positioning unit can comprise a holding unit for holding the positioning unit in or on the rotor blade.

Further configurations of the invention are the subject matter of the dependent claims.

BRIEF DESCRIPTION OF THE SEVERAL VIEWS OF THE DRAWINGS

Advantages and exemplary embodiments of the invention will be explained in detail hereinafter with reference to the drawings.

DETAILED DESCRIPTION

Figure 1:
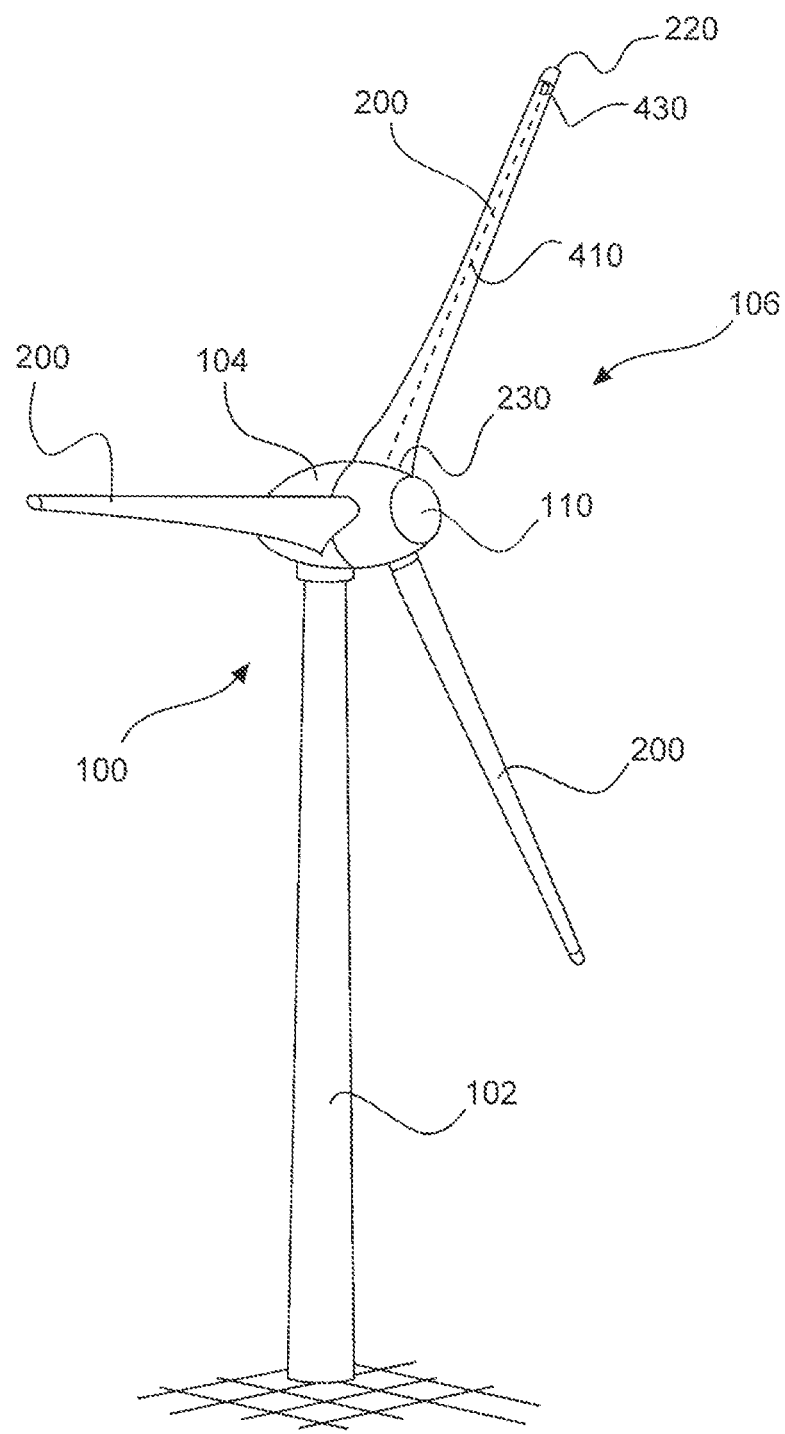
FIG. 1 shows a schematic diagram of a wind turbine according to one exemplary embodiment of the invention, FIGS. 2 and 3 each show a schematic sectional view of a section of a wind turbine rotor blade, FIG. 4 show a schematic diagram of a conducting brush as part of the measuring system

FIG. 1 shows a schematic diagram of a wind turbine according to one exemplary embodiment of the invention.

The wind turbine 100 comprises a tower 102, a nacelle 104, a spinner 110 and three rotor blades 200 which are coupled to the spinner or aerodynamic rotor 106. A generator (not shown) is provided inside the nacelle, whose rotor is coupled to the aerodynamic rotor so that electrical power is generated by movement of the aerodynamic rotor 106.

The rotor blades 200 each have a rotor blade root 210 and a rotor blade tip 220. Further inside the rotor blade 200 a lightning receptor 430 can be provided in the region of the rotor blade tip 220 and an arrestor ring 240 can be provided in the region of the rotor blade root. A lightning protection cable 410 connects the lightning receptors 430 and the arrestor ring 240.

Figure 2:
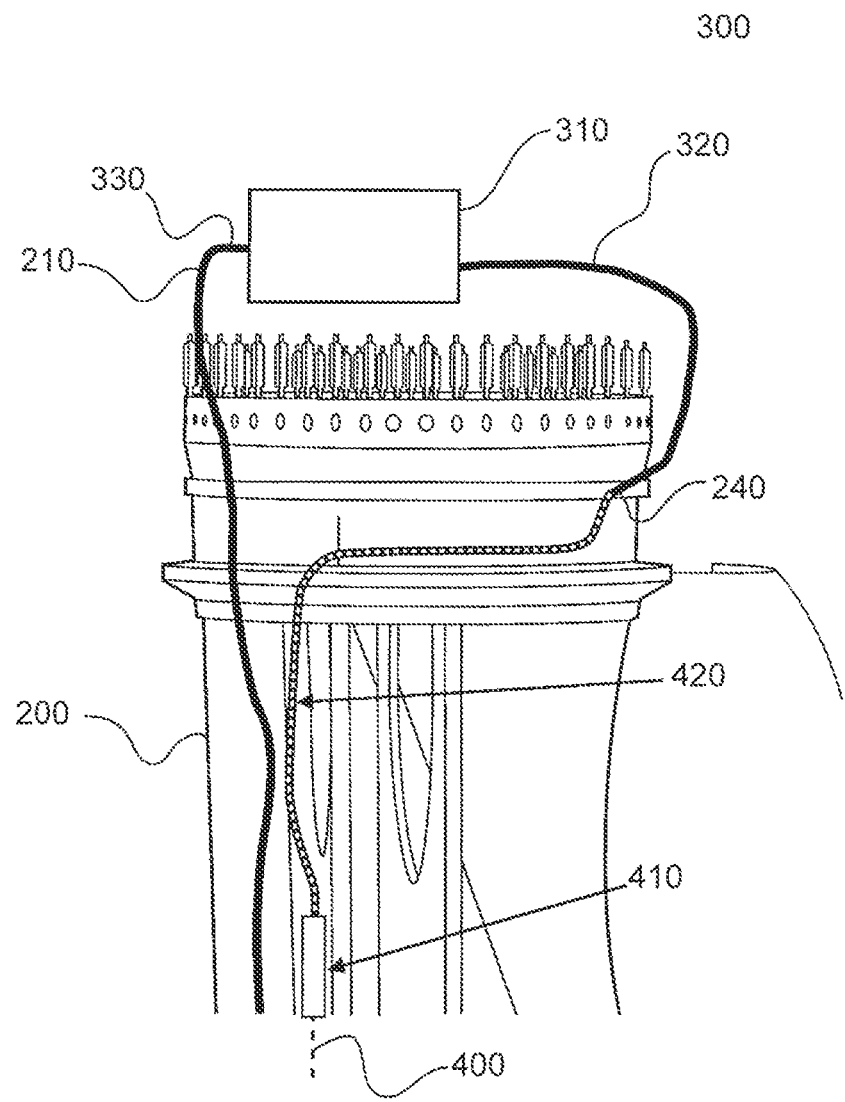
Figure 3:
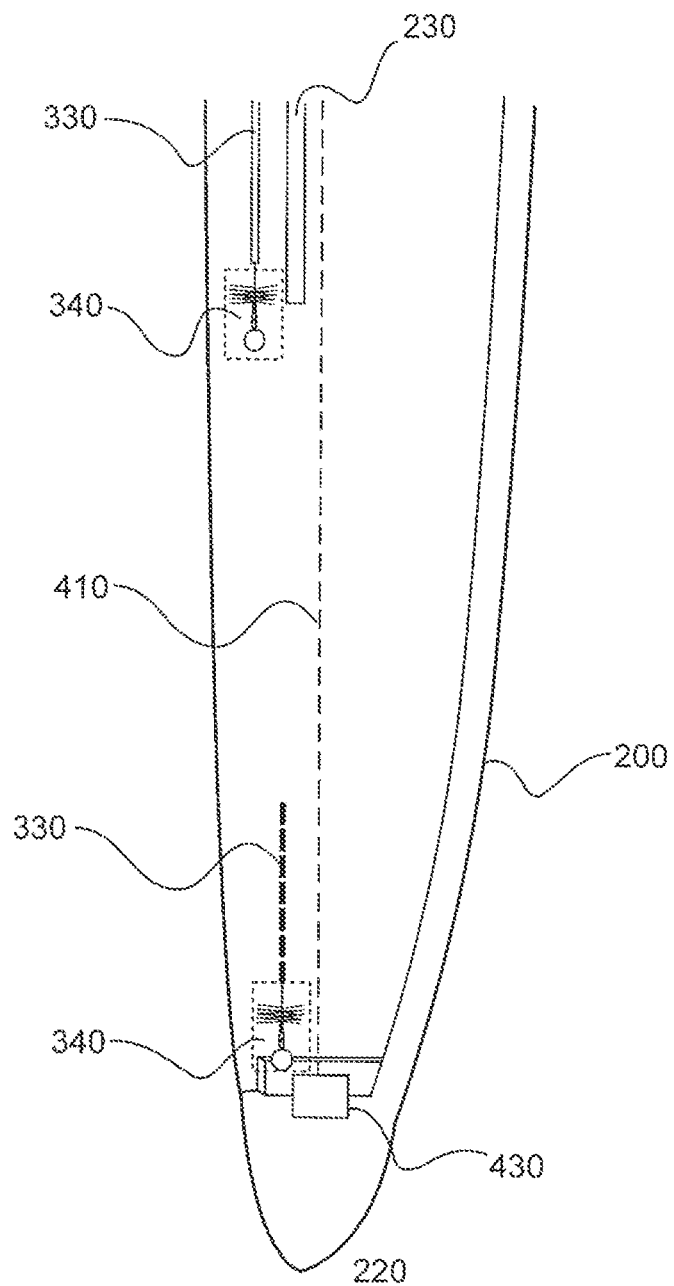

FIGS. 2 and 3 each show a schematic sectional view of a wind turbine rotor blade. In FIG. 2 in particular, the region of the rotor blade root 210 is shown. An arrestor ring 240 of the lightning protection system is provided in the region of the rotor blade root 210. The arrestor ring 240 is coupled via a cable connection 420 to a lightning protection cable 410 which extends along the longitudinal direction of the rotor blade 200.

Alternatively to this aluminum profiles can be used as arrestor section. As a result of the length of the rotor blades these can comprise screw connections which can serve as connections of web segment to web segment.

Furthermore aluminum profiles can be combined with cable trees. Here also exposed screw connections can be provided as connecting elements and be coupled to at least one lightning protection receptor 430 in the region of the rotor blade tip.

A measuring unit 310 can be provided which on the one hand is coupled via a measuring line 320 to the arrestor ring 240. A further measuring line 330 has an electrically conductive tip, e.g., a brush, at its free end, for example, in the form of a chimney sweep brush. The brush 340 is introduced into the interior of the rotor blade 200 by means of the measuring line 330. For this purpose, for example, the rotor blade 200 can be located in a 6 o'clock position so that the measuring line 330 with the brush 340 can be pulled downwards by gravity. Optionally a weight 343 can be provided in the region of the brush 342 in order to pull the brush 342 with the measuring line 330 downwards.

The measuring line 330 is thus configured as an electrically conductive cable and has a chimney sweep brush 342 with a weight 343 at its free end.

The conducting tip of the measuring line 330 can be configured as a brush. It is important here that the tip/brush is electrically conducting and is coupled in a conducting manner to the measuring line 330. The measuring line 330 with the conducting brush 340 is introduced into the interior of the rotor blade 200 until the electrically conductive brush 340 comes into electrical contact with, for example, one of the lightning receptors 430 in the region of the rotor blade tip 220. The receptors and the connection points can be distributed in the entire rotor blade. Then, the measuring unit 310, which for example comprises a pulse generator, can deliver a pulse or measuring signal through the measuring line 330 which then likewise runs through the lightning protection system 400 as a result of the electrical coupling and leads back to the measuring unit 300 via the further measuring line 320.

With the measurement method, it is thus possible to test the lightning protection system inside the rotor blade. Thus it is possible to dispense with working at height which would have been necessary otherwise when testing the lightning protection system outside on the rotor blade. Furthermore, with the system, a testing of the lightning protection system can also be accomplished at those points which are difficult to access or which can only be accessed at high costs. These can be, for example an arrestor section in the spinner and the spark gap as far as the foundation. Furthermore, with the method, a section of the lightning protection system in which many transition points (screw connection, spark gaps, connecting elements) are provided, can easily be tested.

Figure 4:
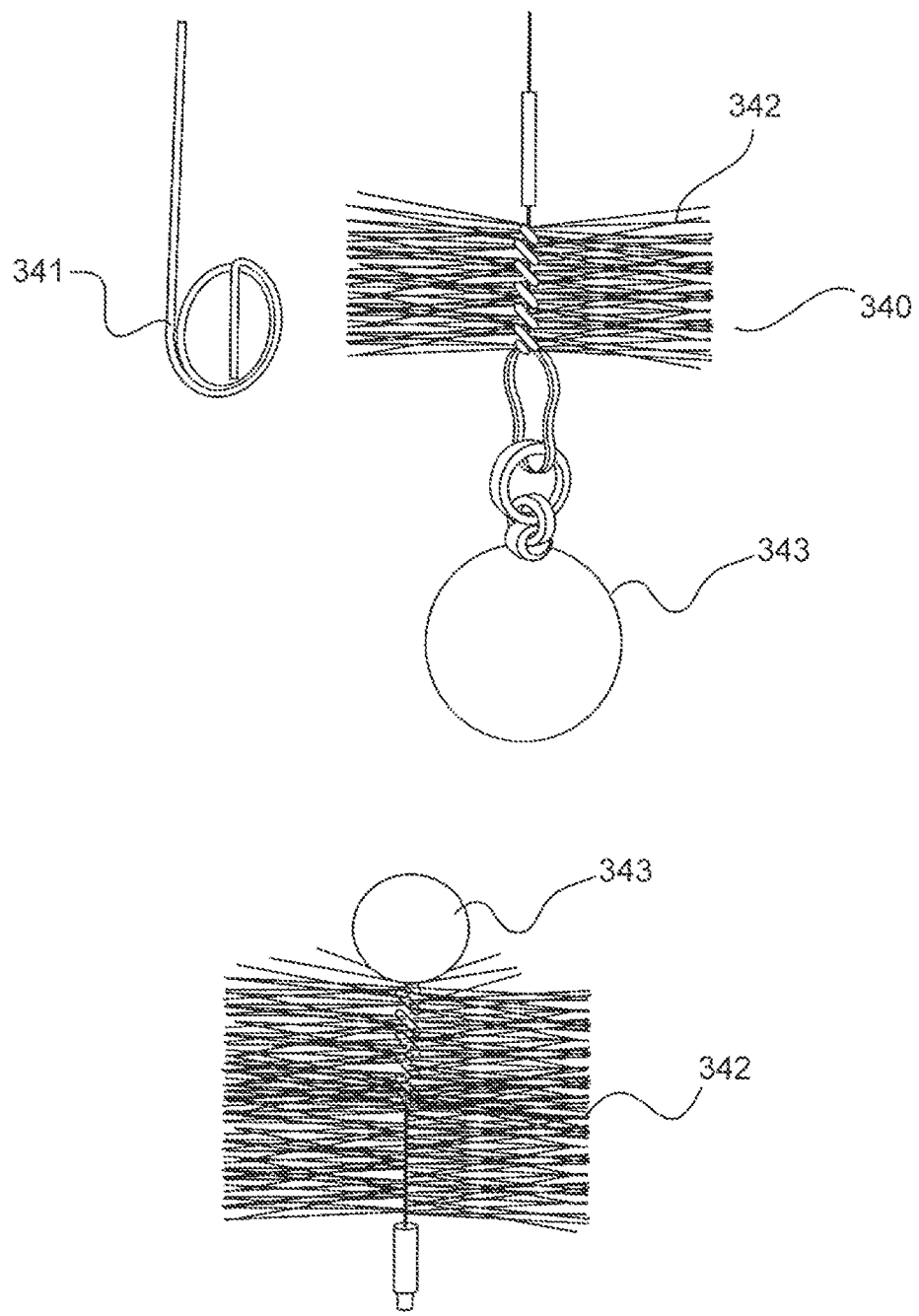

FIG. 4 shows a schematic diagram of a conducting brush as part of the measuring system.

Figure 5:
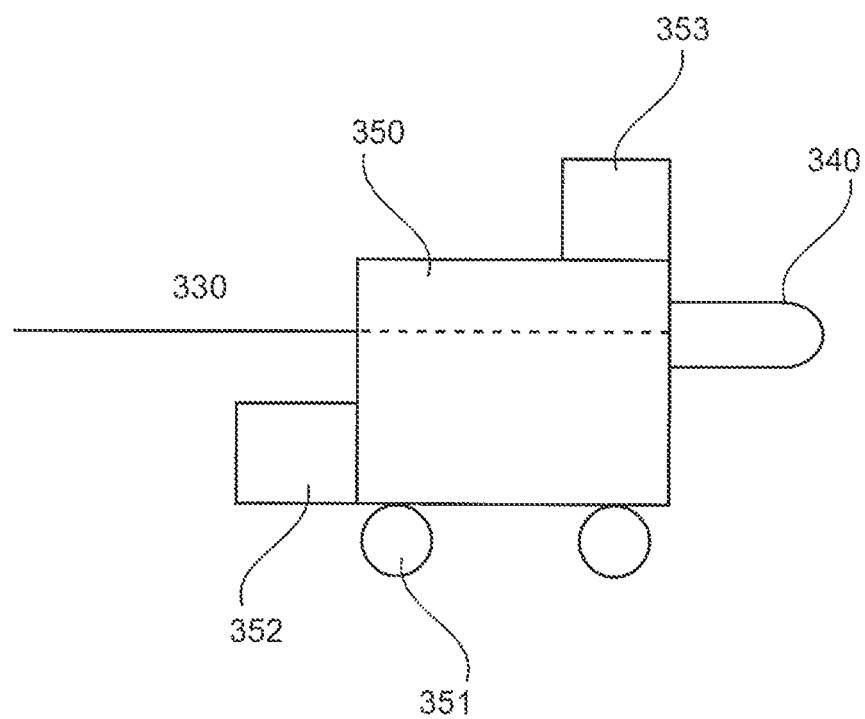
FIG. 5 shows a schematic diagram of a section of the measuring unit.

FIG. 5 shows a schematic diagram of a section of the measuring unit. The measuring unit according to FIG. 5 comprises an electrically conductive tip 340, a measuring line 330 as well as a movable positioning unit 350 by means of which the tip 340 can be moved and/or positioned outside on the rotor blade or inside the rotor blade.

The electrically conductive tip can have the form of the brush 340 according to FIGS. 2 and 3. The movable positioning unit 350 can, for example, have wheels 351 or the like by means of which the movable unit 350 can move along the rotor blade.

The movable positioning unit 350 can be configured to be remote-controllable.

Optionally the movable positioning unit 350 can have a holding unit 352 which prevents the movable positioning unit 350 with the tip 340 from falling down from the surface of the rotor blade. The holding unit 352 can, for example, comprise a vacuum by means of which the movable positioning unit 350 is pressed or sucked onto the surface of the rotor blade. Alternatively the holding unit 352 can comprise at least one magnet by means of which the holding unit 352 can be held on the metal element of the blade. Furthermore, the holding unit 352 can have an inclination detection. Alternatively or additionally a boundary detection can be provided which prevents the positioning unit from falling down or travelling against the walls.

Optionally the movable positioning unit 350 can have a camera 353 by means of which the movement of the tip 340 can be checked in order to ensure that the measuring tip 340 is brought into electrical contact with the desired section of the lightning protection system.

The positioning unit 350 can be used in particular when the rotor blade 200 is located in a 3 o'clock or 9 o'clock position (i.e., substantially horizontal). Alternatively the positioning unit can be used when the rotor blade is located in a perpendicular position, for example.

According to one aspect of the invention, after completing the testing of the lightning protection system the measuring line is removed again. It is thus used only temporarily and therefore is not installed fixedly.

The invention claimed is:

1. A method for testing a lightning protection system in a wind turbine rotor blade, further the method comprising:
   contacting the lightning protection system in a region of a rotor blade root,
   positioning a measuring line having an electrically conductive tip in an interior of the wind turbine rotor blade such that the conductive tip is in contact with an element of the lightning protection system, and
   feeding a signal via the measuring line and measuring the signal arriving at the lightning protection system in the region of the rotor blade root to test a mode of operation of the lightning protection system in a region of the wind turbine rotor blade, and
   removing the measuring line after testing the mode of operation of the lightning protection system.

2. The method according to claim 1, wherein the wind turbine rotor blade has at least one lightning receptor in the region of a rotor blade tip and a lightning protection cable or line in the interior of the rotor blade, the method comprising:

making an electrical contact between the conductive tip and the at least one lightning receptor.

3. The method according to claim 1, wherein the conductive tip is a conductive brush.

4. The method according to claim 1, wherein the conductive tip is a chimney sweep brush or a chimney brush.

5. The method according to claim 1, wherein positioning the measuring line comprises using a movable positioning unit inside or outside on the rotor blade.

6. The method according to claim 1, wherein a movable positioning unit comprises a holding unit for holding the positioning unit in or on the rotor blade.

7. A measuring system for testing a lightning protection system in a wind turbine rotor blade, the measuring system comprising:

a measuring unit for producing an electrical signal, a first measuring line coupled with a conductive brush, and a second measuring line for contacting a part of a lightning protection system in a region of a rotor blade root.

8. The measuring system according to claim 7, further comprising:

a positioning unit for positioning the first measuring line with a tip inside or outside on the rotor blade.

9. The measuring system according to claim 8, wherein the positioning unit comprises a vacuum or one or more magnets configured to hold the positioning unit.

10. A method comprising:

using a chimney sweep brush as a first measuring line for electrically contacting a first section of a lightning protection system inside a wind turbine rotor blade, wherein a second measuring line contacts a second section of the lightning protection system in a region of a rotor blade root of the wind turbine rotor blade, and using a measuring unit coupled to the first and second measuring lines and to output a signal for testing the lightning protection system.

11. The method according to claim 10, wherein using the chimney sweep brush comprises using a weight to cause the chimney sweep brush to be pulled down by gravity to electrically couple to the first section of the lightning protection system.

12. The method according to claim 11, wherein the wind turbine rotor blade is located at a 6 o'clock position.

* * * * *

UNITED STATES PATENT AND TRADEMARK OFFICE
CERTIFICATE OF CORRECTION

| | |
|---|---|
| PATENT NO. | : 11,815,064 B2 |
| APPLICATION NO. | : 17/636316 |
| DATED | : November 14, 2023 |
| INVENTOR(S) | : Gerhard Jansen |

Page 1 of 1

It is certified that error appears in the above-identified patent and that said Letters Patent is hereby corrected as shown below:

In the Claims

Column 4, Claim 1, Line 52:
"rotor blade, further the method comprising:"
Should read:
-- rotor blade, the method comprising: --.

Column 4, Claim 1, Line 58:
"system, and"
Should read:
-- system, --.

Signed and Sealed this
Fifteenth Day of April, 2025

Coke Morgan Stewart
*Acting Director of the United States Patent and Trademark Office*